July 6, 1965

K. F. JOHNSON ETAL 3,193,171

APPARATUS FOR SHEARING, FORMING AND TRANSFERRING ARTICLES

Original Filed Jan. 9, 1961

INVENTORS
K. F. JOHNSON
A. L. QUINLAN
B. L. WRIGHT
BY A.C. Schwarz, Jr.
ATTORNEY

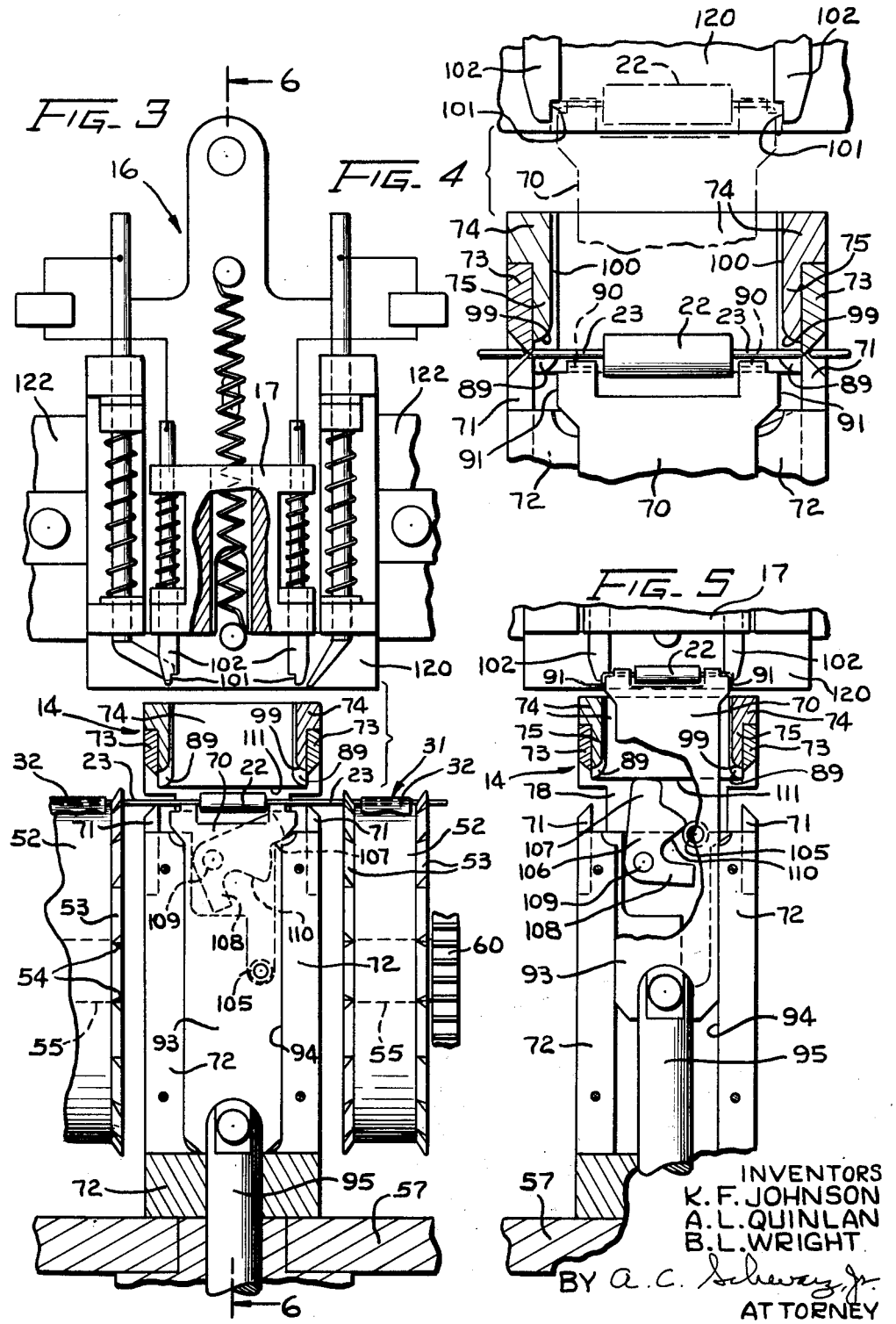

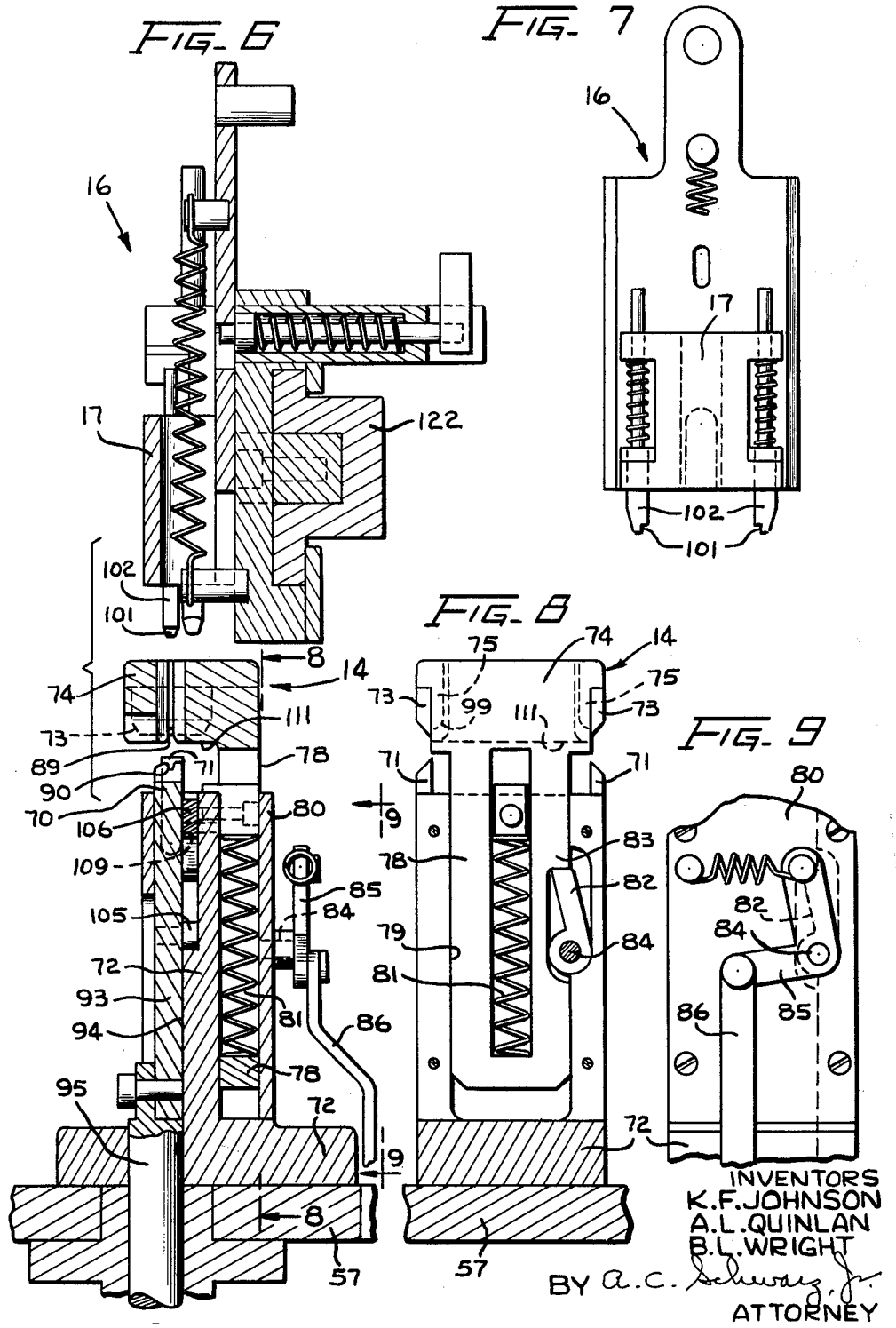

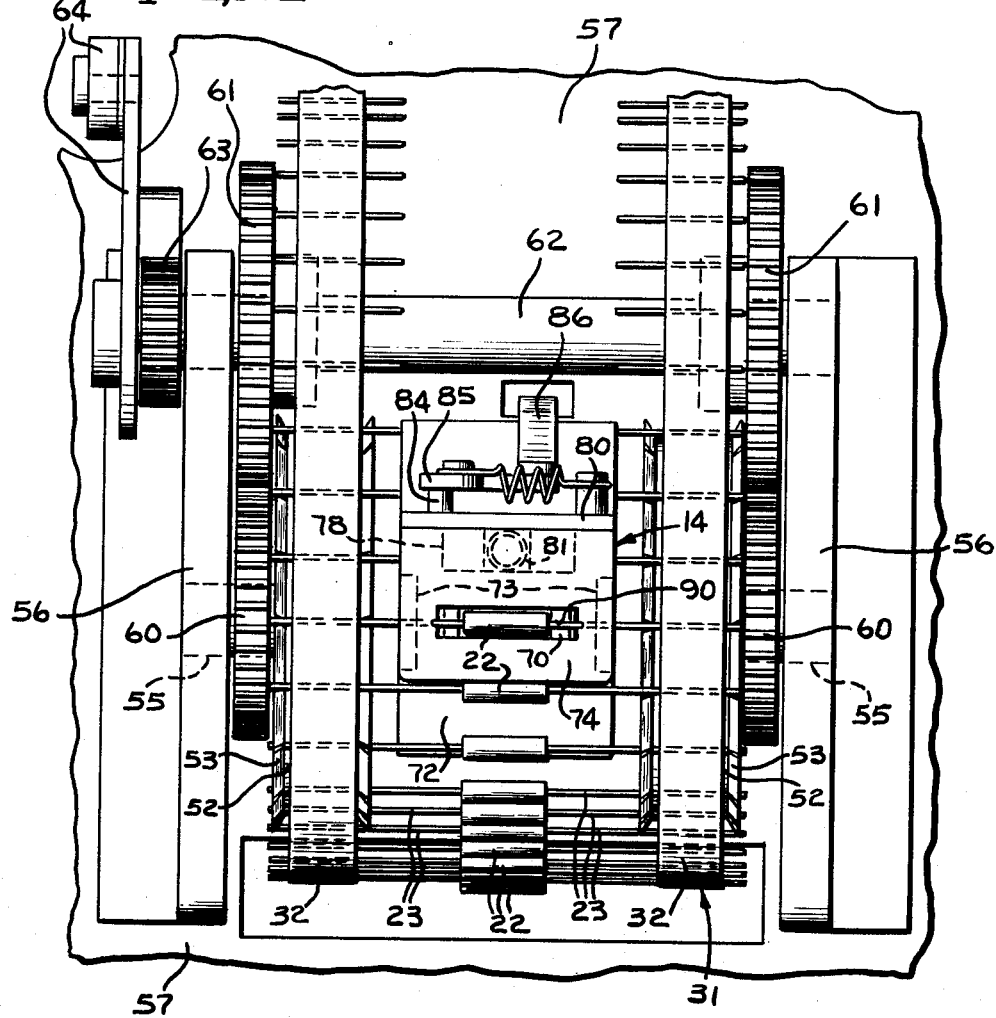
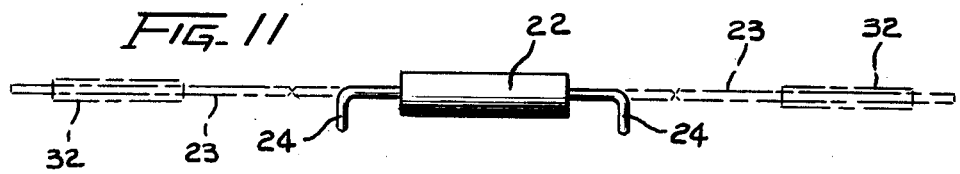

United States Patent Office 3,193,171
Patented July 6, 1965

3,193,171
APPARATUS FOR SHEARING, FORMING AND TRANSFERRING ARTICLES
Kenneth F. Johnson, Oak Lawn, Amos L. Quinlan, La Grange Park, and Ben L. Wright, Chicago, Ill., assignors to Western Electric Company, Incorporated, New York, N.Y., a corporation of New York
Original application Jan. 9, 1961, Ser. No. 81,442, now Patent No. 3,081,396, dated Mar. 12, 1963. Divided and this application Nov. 13, 1962, Ser. No. 237,068
5 Claims. (Cl. 228—13)

This invention relates to an apparatus for forming and transferring articles, and more particularly to apparatus for shearing and forming leads of electrical components and transferring the components to a welding head.

This is a divisional application of the co-pending application Serial No. 81,442 filed January 9, 1961, on an "Apparatus for Forming and Welding" now Patent No. 3,081,396, issued on March 12, 1963.

An object of the invention is to provide an improved apparatus for forming and transferring articles.

Another object of the invention is to provide an apparatus for shearing and forming leads of electrical components and transferring the components to a welding head.

An apparatus illustrating certain features of the invention may include a feed device for intermittently advancing a string of tape-interconnected electrical components to position successive components onto a pair of fixed lower shearing blades and above a vertically movable plunger therebetween and below a pair of movable upper shearing blades and a pair of upper lead bending elements. Actuating mechanism is provided to lower the upper shearing blades to shear the leads to a predetermined length and to sever the component from the tapes and thereafter to raise the plunger and cause the component to be carried upwardly thereby through the bending elements and cause the leads to be bent thereby around portions of the plunger. Continued movement of the plunger upwardly toward a welding head supported in its path carries the component to a predetermined position with the formed leads seated in and releasably held by a pair of electrodes on the welding head, after which the plunger and the upper shearing blades are returned to their normal positions.

Other objects, advantages and novel aspects of the invention will become apparent upon consideration of the following detailed description, in conjunction with the accompanying drawings, in which:

FIG. 3 is an enlarged fragmentary vertical sectional view of the apparatus taken on the line 3—3 of FIG. 2 showing an article in shearing position and the shearing blades in open position;

FIG. 4 is an enlarged fragmentary vertical sectional view of the mechanism shown in FIG. 3 and showing in full lines the article being sheared and showing in dotted lines the formed article being transferred to a welding head;

FIG. 5 is a fragmentary vertical sectional view of the apparatus showing the article transferring mechanism in raised position;

FIG. 6 is a fragmentary vertical cross-sectional view of the apparatus taken on line 6—6 of FIG. 3;

FIG. 7 is a front view of a portion of the welding head for receiving the formed article;

FIG. 8 is a vertical sectional view of a portion of the apparatus taken on line 8—8 of FIG. 6;

FIG. 9 is a fragmentary elevational view of the apparatus looking in the direction of arrows 9—9 of FIG. 6;

FIG. 10 is an enlarged fragmentary plan view of the apparatus taken on line 10—10 of FIG. 1; and FIG. 11 is a view of the article processed in the present apparatus.

Figure 1:
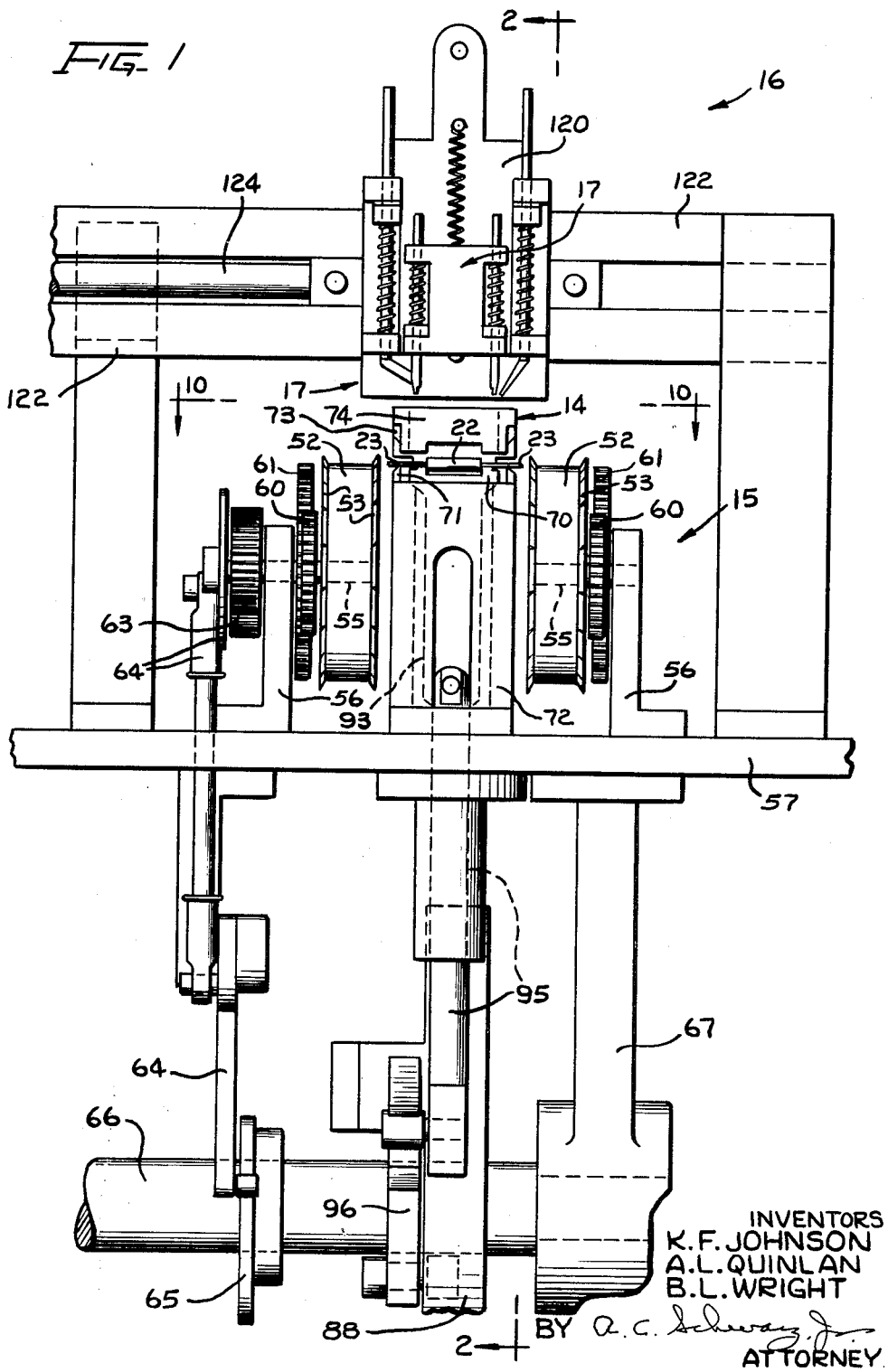
FIG. 1 is a fragmentary front elevational view of the article forming and transferring apparatus as applied to a welding machine.

Referring to the drawings, particularly FIG. 1, the present apparatus 15 for forming and transferring articles is shown mounted on a welding machine 16 below a movable welding head 17 thereof. The articles are in the form of electrical components 22 having leads 23 extending from opposite ends thereof. The electrical components 22 are supplied in a string 31 (FIGS. 10 and 11) and are supported in parallel and spaced relation to each other with the end portions of the leads secured between pairs of adhesive tapes 32. The apparatus 14 is designed to shear the leads 23 of the components to a predetermined length and thus sever the components from the tapes, to bend the leads to form parallel transversely displaced end portions 24, and to transfer the components to the welding head.

Figure 2:
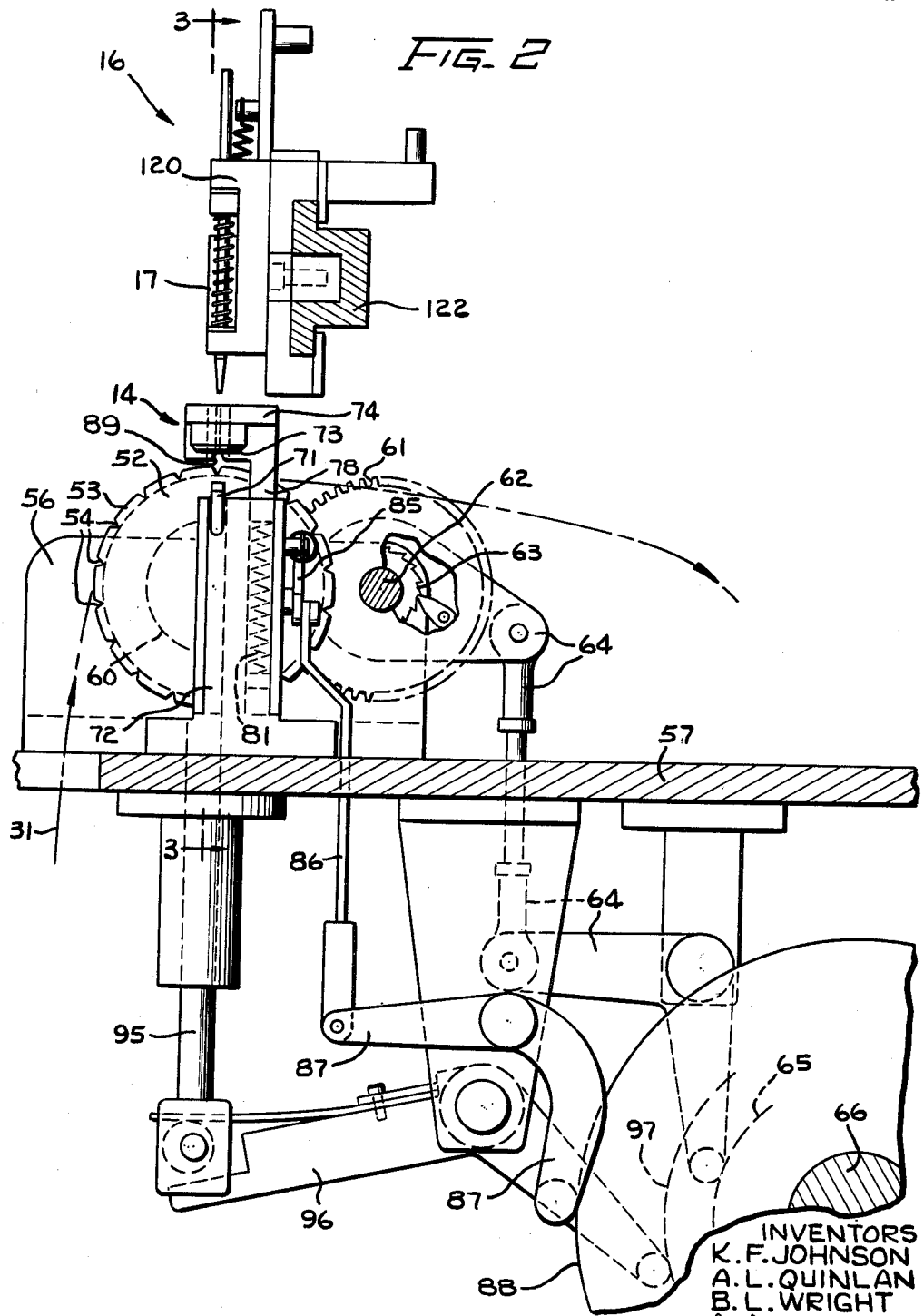
FIG. 2 is a vertical sectional view of the apparatus taken along the line 2—2 of FIG. 1.

The string 31 of components 22 is intermittently advanced by a pair of feed rolls 52 (FIGS. 1–3 and 10) which are provided with cylindrical surfaces for supporting the tapes 32 thereon and which have flanges 53 for centering the tapes 32 therebetween and locating the component longitudinally in a predetermined position. The straight leads 23 of the components 22 fit in notches 54 in the flanges 53. The feed wheels 52 are rotatably mounted on stub shafts 55 fixed to supports 56 on a horizontal frame plate 57 of the apparatus. Gears 60 fixed to the feed wheels 52 mesh with drive gears 61 fixed to a drive shaft 62 which is journaled in the supports 56. The shaft 62 is actuated intermittently through a pawl and ratchet device 63 and linkage 64 (FIG. 2) from a cam 65 on a cam shaft 66 for imparting intermittent movement to the feed wheels 52. The cam shaft 66 is rotatably supported in suitable bearing brackets 67 depending from the horizontal frame plate 57 and is driven by a suitable drive (not shown).

Successive components 22 are advanced by the feed wheels 52 to a predetermined position at the upper portion thereof in vertical alignment with the welding head 17 and above a vertically movable forming punch or plunger 70 (FIGS. 1–6) and with the leads 23 of the components disposed above a pair of stationary shear blades 71 secured to a stationary hollow support 72 on the horizontal frame plate 57. The stationary shear blades 71 cooperate with a pair of movable shear blades 73 mounted on a movable hollow rectangular member or carrier 74 disposed above the punch 70 for shearing the leads to a predetermined length. As shown in FIG. 4, the cutting edges of the shear blades 71 and 73 are shaped so as to form ridges on the ends of the leads 23 of the components 22.

The carrier 74 also supports a pair of upper forming dies 75 (FIGS. 3, 6 and 8) for vertical movement and has a downwardly directed bar 78 slidable in a guideway 79 in the support 72. A cover plate 80 is secured to the support 72 to retain the bar 78 in the guideway 79. A spring 81 disposed in a slot in the bar 78 stresses the carrier 74 for movement downwardly and a latch 82

(FIG. 8) engageable with a shoulder 83 on the bar 78 holds the carrier 74 in a normal raised position. The latch 82 is secured to a pin 84 which is mounted for oscillatory movement on the cover plate 80 and is connected to a lever 85 (FIG. 9). The lever 85 is actuated through a link 86 and a cam lever 87 (FIG. 2) by a cam 88 to release the spring loaded carrier 74 with the shear blades 73 and effect the downward movement thereof under the influence of the spring to cause the shearing of the leads 23.

The severed component 22 is supported by the lower shear blades 71 (FIG. 4) above the forming punch 70 and with the leads 23 of the component disposed in slots 89 (FIG. 6) in the lower ends of the upper forming dies 75. The forming punch has raised end portions provided with horizontal grooves 90 for receiving the sheared leads 23 and has vertical end surfaces 91 (FIG. 4) against which the leads 23 are bent to form the transverse parallel end portions 24. A shank 93 on the forming punch 70 is guided for vertical movement in a guideway 94 in the support 72 and is actuated through a rod 95 and a lever 96 (FIG. 2) by a cam 97 on the cam shaft 66 for effecting the reciprocation of the forming punch in timed relation to the actuation of the feed wheels 52 and the forming dies 75.

During the upward movement of the forming punch 70, the component 22 is carried upwardly thereby between the upper forming dies 75, and the projecting ends of the leads 23 engage a pair of forming surfaces 99 (FIG. 4) on the forming dies 75 and are bent downwardly thereby against the end surfaces 91 of the punch to form the downwardly transversely disposed end portions 24. The lead portions 24 ride in a pair of vertical grooves 100 (FIGS. 4 and 6) in the forming dies 75 as continued movement of the punch 70 carries the component 22 upwardly past the forming dies into the welding head 17 and presses the formed leads 23 into seats 101 on the ends of a pair of electrodes 102 on the welding head (FIGS. 3-5).

During the upward movement of the forming punch 70, a pin 105 on the shank 93 of the forming punch (FIGS. 3, 5 and 6) actuates a cam 106 to cause the cam to raise the carrier 74 with the forming dies 75 and the shearing blades 73 thereon a distance sufficient to permit the carrier 74 to be engaged and locked in its upper position by the latch 82 (FIG. 8). The cam 106 is in the form of a bell crank lever having arms 107 and 108 and is pivotally mounted for movement about a pin 109 on the support 72. During the upward movement of the forming die, the pin 105 engages a portion 110 of the cam 106 and rocks the cam in a counterclockwise direction as viewed in FIG. 3 to cause the end portion of the arm 107 of the cam to engage the horizontal lower surface 111 of the carrier 74 (FIGS. 5 and 6) to effect the raising of the forming dies 75 and shear blades 73 to the upper position (FIG. 5). As the forming punch 70 descends the pin 105 engages the arm 108 and rocks the cam 106 in a clockwise direction to disengage the cam from the movable carrier 74.

The welding head 17 is mounted for vertical movement on a carriage 120 and is releasably held in an operative position as shown in FIG. 1 by suitable latching mechanism. The carriage 120 is slidably mounted for horizontal movement on a track 122 to and from a loading position above and in vertical alignment with the article forming apparatus 15 and with the electrodes 102 of the welding head in position to receive the formed leads 23 of the electrical component 22. Mechanism (not shown) including an actuating rod 124 connected to the carriage 120 operates in timed relation to the operation of the article forming and transferring mechanism 15 to shift the carriage 120 with the welding head 17 thereon from the loading position as shown in FIG. 1 to a welding position (not shown) so that after the electrical component has been transferred to the welding head 17, the carriage 120 and the welding head with the component thereon may be shifted to the welding station and the welding head actuated to effect the welding of the electrical component 22 to a circuit board (not shown).

In the operation of the apparatus the feed wheels 52 are actuated to advance intermittently the string 31 of components 22 and locate a component in operative position on the lower shearing blades 71 and above the forming punch 70. The latch 82 is then cam actuated to release the carrier 74 and effect its downward movement under the influence of the spring 81 to cause the upper shearing blades 73 to shear the leads 23 against the lower shearing blades 71 and sever the component 22 from the tapes 32. The forming punch 70 is then raised by the action of the cam 97 to carry the component 22 upwardly through the forming dies 75 to effect the bending of the end portions 24 of the leads about the forming surfaces 91 of the forming punch by the forming elements.

Thereafter, the forming punch lifts the component 22 with the formed leads thereon to a predetermined position to nest the leads in the seats 101 of the electrodes 102 and thus transfer the component to the welding head 17, the electrodes 102 serving to releasably retain the component as the forming punch 70 recedes. After the shearing of the leads 23 and during the upward movement of the forming punch 70, the actuating pin 105 engages the cam 106 and turns it in a counterclockwise direction from the position shown in FIG. 3 to the position shown in FIG. 5, during which turning movement the arm of the cam engages the carrier 74 and raises it to a normal upper position in which it is retained by the latch 82.

After the component 22 has been transferred to the electrodes 102 of the welding head 17 and during the downward movement of the carrier 74, the actuating pin 105 on the carrier turns the cam 106 in a clockwise direction from the position shown in FIG. 5 to the normal retracted position shown in FIG. 3 to provide clearance for downward movement of the carrier 74 and the upper shearing blades during the following cycle of operation.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus of the type described having a welding head for holding a formed article, the combination therewith of:

support means;

a pair of fixed shearing blades mounted on said support means in horizontally spaced relation to each other for supporting an article thereon below the welding head;

a forming member mounted on said support means for vertical movement between said shearing blades from a normal position below the article on said shearing blades;

a pair of vertically movable shearing blades mounted above and cooperable with said fixed shearing blades for shearing portions of the article;

latching means for releasably supporting said movable shearing blades in an upper position in spaced relation to said fixed shearing blades;

means for actuating said latching means to release said movable shearing blades;

resilient means operable in response to the release of said movable shearing blades for actuating said movable shearing blades to effect the shearing of portions of the article;

a pair of forming elements mounted on opposite sides of said forming member and above an article supported on the fixed shearing blades;

means for actuating said forming member to carry the article upwardly between said forming elements into engagement with the welding head to effect the transverse bending of the end portions of the article and the transfer of the formed article to the welding head; and means responsive to the upward movement of said forming means for raising said movable shearing blades into engagement with said latching means for retention thereby.

2. In an article shearing and forming apparatus:

support means;

a pair of lower shearing blades fixedly mounted in horizontally spaced relation to each other on said support means for supporting an article thereon;

a carrier mounted on said support means for vertical movement;

a pair of upper shearing blades mounted on said carrier above said lower shearing blades for cooperation therewith to shear the article to a predetermined length;

resilient means for urging said carrier downwardly;

means for latching said carrier in a normal upper position with said upper shearing blades spaced from said lower shearing blades;

means for actuating said latching means to effect the release of said carrier and the actuation of said upper shearing blades to shear the article;

a pair of spaced upper forming elements mounted on said carrier between said upper shearing blades;

a forming member mounted on said support means for vertical movement between said lower shearing blades, between said upper shearing blades, and between said forming elements from a normal lower position below an article on said lower shearing blades to a predetermined upper position;

means for raising and lowering said forming member to carry the sheared article upwardly between said forming elements to effect the bending of the end portions of the article;

a member pivotally mounted on said support means and operable in response to turning movement thereof from a normal inoperative position to an operative position for raising said carrier to the upper position; and means on said forming member operable in response to upward movement of said forming member for turning said carrier raising member to operative position and operable in response to downward movement of said forming member for returning said carrier raising member to inoperative position.

3. In an apparatus of the type described:

support means;

a pair of lower shearing blades fixedly mounted on said support means in horizontally spaced relation to each other for supporting an article thereon;

a carrier mounted slidably on said support means for up and down movement;

a pair of upper shearing blades mounted on said carrier above and in alignment with said lower shear blades;

means for actuating said carrier to effect the shearing of the article to a predetermined length;

a lower forming member mounted for up and down movement on said support means between said lower shearing blades and having an upper surface for supporting the article and having end surfaces about which end portions of the article are bent;

a pair of forming elements mounted on said carrier above said forming member and cooperable therewith for bending the article;

a head mounted on said support means for movement to and from a loading position above and in a predetermined relation to said forming member for receiving the article; and means for raising said forming member between said forming elements to said head to effect the bending of the ends of the article and the transfer of the article to said head.

4. In an apparatus of the type described:

support means;

a welding head movable on said support means to and from a predetermined loading station for receiving an article therein;

a pair of lower shearing blades fixedly mounted on said support means below said welding head at said loading station;

a pair of upper shearing blades;

a member mounted for vertical movement on said support means for supporting said upper shearing blades above said lower shearing blades and for movement into engagement therewith;

a pair of upper forming elements mounted on said movable member adjacent said upper shear blades;

means for feeding an article to a shearing position on said lower shearing blades;

latching means for holding said movable member in a normal upper position with the upper shearing blades above and in spaced relation to said lower shearing blades;

resilient means for stressing said movable member for downward movement;

means for releasing said latching means to effect the downward movement of said upper shear blades to shear the article to a predetermined length;

a lower forming member disposed between said lower shear blades and an article supported thereon;

means for vertically reciprocating said lower forming member to move the article upwardly between said pair of upper forming elements to effect the bending of portions of the article about said lower forming member and the transfer of the article to said welding head; and means responsive to the upward movement of said lower forming member for returning said movable member to the normal upper position thereof.

5. In an apparatus of the type described having a welding head movable to and from a loading station for receiving an article:

a pair of lower shearing blades for supporting an article thereon;

support means for fixedly supporting said lower shearing blades below said welding head at said station;

a carrier mounted on said support means for vertical movement;

a pair of upper shearing blades mounted on said carrier above said lower shearing blades for cooperation therewith to shear the article to a predetermined length;

resilient means for urging said carrier downwardly;

latching means for releasably holding said carrier in a normal upper position with said upper shearing blades in spaced relation to said lower shearing blades;

means for feeding an article onto said lower shearing blades;

means for actuating said latching means to effect the release of said carrier and the actuation of said upper shearing blades to shear the article;

a pair of spaced upper forming elements mounted on said carrier between said upper shearing blades;

a forming member mounted on said support means for vertical movement between said lower shearing blades, said upper shearing blades, and said forming elements from a normal lower position below an article on said lower shearing blades;

means for raising and lowering said forming member to carry the sheared article upwardly between said forming elements to effect the bending of portions of the article and the transfer of the article to said welding head;

a cam member pivotally mounted on said support means and operable in response to turning movement thereof from a normal inoperative position to an operative position for raising said carrier to said upper position; and means on said forming member responsive to the upward movement of said forming member for turning said carrier raising member to operative position and responsive to downward movement of said forming member for returning said carrier raising member to inoperative position.

References Cited by the Examiner
UNITED STATES PATENTS

| | | | |
|---|---|---|---|
| 2,713,362 | 7/55 | Stahl | 140—71 |
| 3,010,492 | 11/61 | Ryder et al. | 140—104 |
| 3,052,278 | 9/62 | Baluck et al. | |

CHARLES W. LANHAM, *Primary Examiner*.